June 17, 1924.
N. J. ANDERSON
RIM TOOL
Filed June 12, 1922
1,497,708
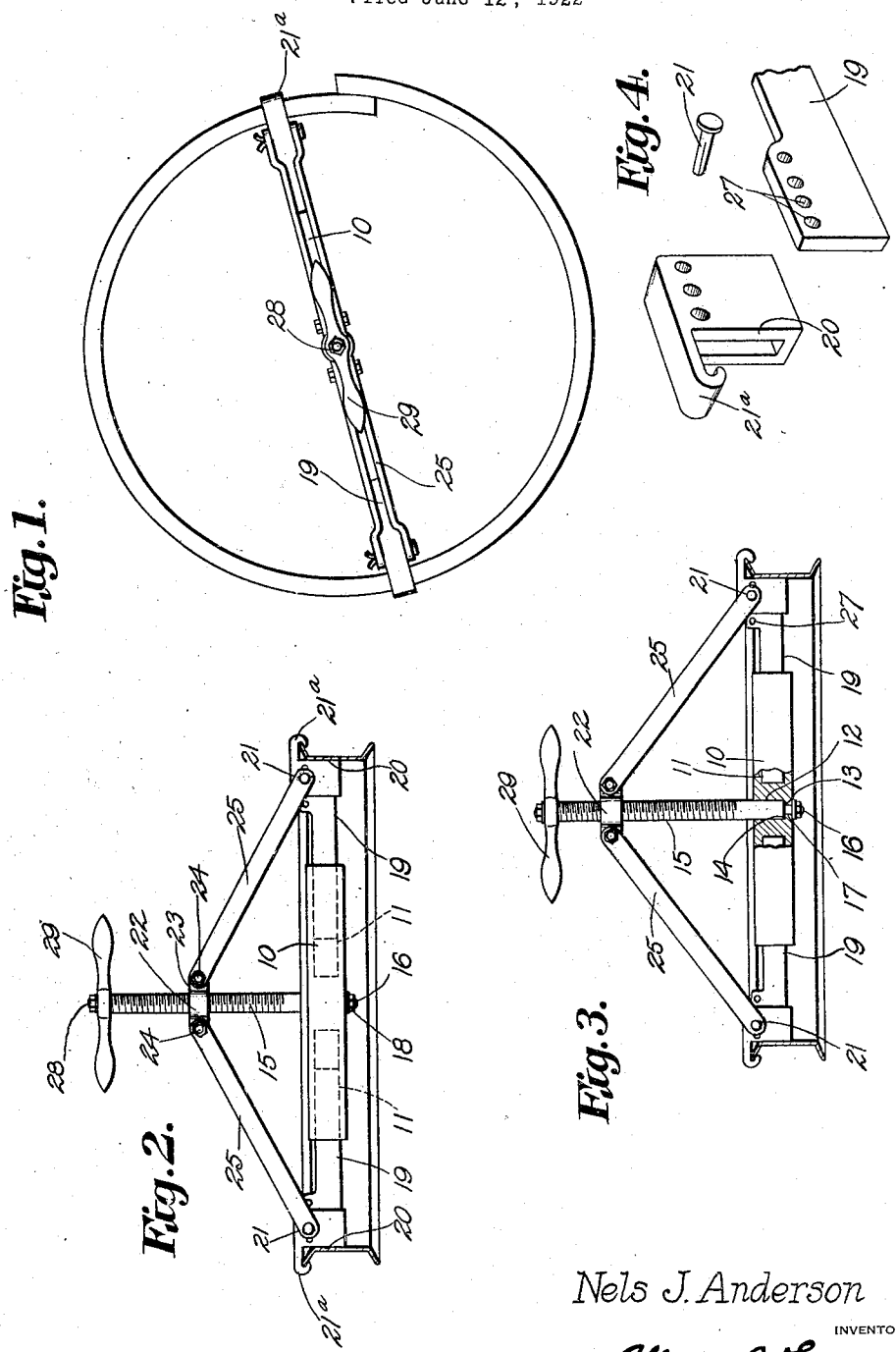
Nels J. Anderson
INVENTOR
BY Victor J. Evans
ATTORNEY Patented June 17, 1924.

1,497,708

UNITED STATES PATENT OFFICE.

NELS J. ANDERSON, OF OWEN, WISCONSIN.

RIM TOOL.

Application filed June 12, 1922. Serial No. 567,717.

*To all whom it may concern:*

Be it known that I, NELS J. ANDERSON, a citizen of the United States, residing at Owen, in the county of Clark and State of Wisconsin, have invented new and useful Improvements in Rim Tools, of which the following is a specification.

This invention relates to rim tools.

An object of the present invention is the provision of a tool which may be easily and quickly applied to a vehicle wheel rim for contracting or expanding the same to facilitate the changing of tires.

Another object of the invention is the provision of a tool of the above character, wherein the rim engaging members exert a contracting or expanding action substantially central of the width of the rim and thereby prevent buckling or springing the rim.

With the above and other objects in view, the invention further includes the following novel features and details of construction, to be hereinafter more fully described, illustrated in the accompanying drawings and pointed out in the appended claim.

In the drawings:—

Figure 1 is a plan view showing the tool applied to a vehicle rim.

Figure 2 is a transverse sectional view of the rim with the tool in elevation.

Figure 3 is an elevation of the tool shown in its contracted position.

Figure 4 is a perspective detail embodying the invention.

Referring in detail to the drawings, wherein like characters of reference denote corresponding parts, the reference character 10 indicates a guide member which is substantially rectangular in cross sectional shape and which is provided at each end with a guide opening 11, while a transversely extending socket 12 is located in the member 10 intermediate the inner ends of the openings. The socket 12 is shaped to provide a seat 13 for engagement by an annular shoulder 14 provided upon the inner end of a screw 15, the latter having a reduced threaded end 16 which extends through an opening 17 located at the inner end of the socket 12, which receives a nut 18. The inner end of the screw 15 is thus swiveled within the member 10.

Slidingly mounted within the openings 11 are aligned arms 19, whose outer ends slidingly receive sleeves 20, the said arms and sleeves being rectangular in cross section. The sleeves 20 are adjustably mounted upon the outer ends of the arms 19 and are held in adjusted position by means of pins 21 which extend through registering openings in the arms and sleeves. The outer ends of the sleeves 20 define abutments or shoulders which are adapted to engage the inner periphery of the rim so that the arms 19 may be moved outward to expand the rim. Extending from the outer ends of the sleeves 20 are hooks 21ª, which engage over the edge of the rim and when the arms 19 are moved inward, act to draw the rim inward so as to contact the same, and in addition, act to center the arms 19 between the opposite edges of the rim.

Mounted upon the screw 15 is a nut 22, which is provided with oppositely extending lugs 23 and pivotally connected to each of these lugs as indicated at 24 are the inner ends of rods 25. These links are preferably arranged in pairs upon opposite sides of the screw 15 and have one of their ends connected to the lugs 23 as previously stated, while their opposite ends are removably and pivotally secured to the arms 19 upon the pins 21, the said arms being provided with a plurality of openings 27 to permit of an adjustable connection between the rods 25 and the arms 19.

In the use of the invention, adjustment is made through the pivotal connecting means between the rods 25 and arms 19, to adjust the tool to the diameter of the particular rim with which it is used. By rotating the screw in one direction, the arms 19 may be drawn inward within the openings 11 and the rim contracted, the tool serving to hold the rim in its contracted condition until manually moved. The reverse rotation of the tool 15 will move the arms 19 outward and against the abutments or shoulders 20 to engage the inner periphery of the rim and force the latter outward until it is fully expanded.

To facilitate rotation of the screw 15, the latter is provided with a reduced extremity 28, to which is secured an operating handle 29.

The invention is susceptible of various changes in its form, proportions and minor details of construction and the right is herein reserved to make such changes as properly fall within the scope of the appended claim.

Having described the invention what is claimed is:—

A rim tool embodying a guide member having oppositely disposed guide openings in the ends thereof and a socket arranged between the inner ends of the guide openings, a screw swivelled in the socket, arms slidably mounted in the guide openings, a sleeve receiving the outer end of each arm, an abutment shoulder formed on the outer end of each sleeve, a rim engaging hook extending from each abutment shoulder, a nut operating upon the screw, links connecting the arms with the sleeves and nut respectively whereby the movement of the arms, sleeves and links is simultaneously accomplished by the movement of the nut longitudinally on the screw and means for accomplishing simultaneous adjustment between the arms, sleeves and links respectively.

In testimony whereof I affix my signature.

NELS J. ANDERSON.